United States Patent [19]

Ciokajlo et al.

[11] Patent Number: 5,388,964
[45] Date of Patent: Feb. 14, 1995

[54] HYBRID ROTOR BLADE

[75] Inventors: John J. Ciokajlo, Henderson, Nev.; Michael T. O'Brien, Cincinnati, Ohio

[73] Assignee: General Electric Company, Cincinnati, Ohio

[21] Appl. No.: 120,897

[22] Filed: Sep. 14, 1993

[51] Int. Cl.⁶ .............................................. F01D 5/30
[52] U.S. Cl. ................................. 416/204 A; 60/226.1
[58] Field of Search .............. 416/204 A, 207, 128, 416/129; 60/226.1

[56] References Cited

U.S. PATENT DOCUMENTS

| | | | |
|---|---|---|---|
| 3,053,437 | 9/1962 | Ambrose | 230/134 |
| 3,528,246 | 9/1970 | Fischer | 60/226 |
| 3,729,957 | 5/1973 | Petrie et al. | 60/226 R |
| 4,043,121 | 8/1977 | Thomas et al. | 60/204 |
| 4,055,042 | 10/1977 | Colley | 60/226 R |
| 4,288,983 | 9/1981 | O'Rourke, Jr. | 60/226 R |
| 4,732,538 | 3/1988 | Wollenweber et al. | 416/94 |
| 4,751,816 | 6/1988 | Perry | 416/129 |
| 4,758,129 | 7/1988 | Stock et al. | 416/128 |
| 4,809,498 | 3/1989 | Giffin, III et al. | 416/129 |
| 4,936,748 | 6/1990 | Adamson et al. | 416/129 |
| 5,197,857 | 3/1993 | Glynn et al. | 416/204 |
| 5,222,360 | 6/1993 | Antuna et al. | 60/226.1 |
| 5,224,341 | 7/1993 | Munroe et al. | 60/226.1 |
| 5,261,227 | 11/1993 | Giffin, III | 60/226.1 |

Primary Examiner—John T. Kwon
Attorney, Agent, or Firm—Jerome C. Squillaro; Nathan D. Herkamp

[57] ABSTRACT

A hybrid gas turbine engine rotor blade includes an airfoil and a dovetail integrally joined thereto. The airfoil includes an inner portion disposed adjacent to the dovetail to provide a structural transition, and an outer portion disposed thereabove for effecting a pressure rise in airflow channeled thereacross. A nosepiece is disposed adjacent to the leading edge of the airfoil inner portion, and a tailpiece is disposed adjacent to the trailing edge of the airfoil inner portion. The nosepiece, tailpiece, and airfoil inner portion are collectively aerodynamically configured for effecting a pressure rise in the airflow channeled thereacross.

9 Claims, 5 Drawing Sheets

HYBRID ROTOR BLADE

The present invention relates generally to gas turbine engines, and, more specifically, to rotor blades therein.

BACKGROUND OF THE INVENTION

Commercial passenger-carrying aircraft are typically powered by high bypass turbofan gas turbine engines for propelling the aircraft as subsonic speeds. A portion of inlet air is pressurized by a fan and bypasses the core engine for providing a majority of the thrust from the engine during operation. The remaining portion of the inlet air is channeled through the core engine Wherein it is compressed, mixed with fuel, and ignited for generating combustion gas from which energy is extracted for powering the core engine and the fan.

The fan size, or outer diameter thereof, is a primary factor in the maximum thrust capability of the engine. Larger fan diameter allows increased propulsion thrust from the engine, but also increases size and weight of the engine which adversely affect fuel burn by decreasing specific fuel consumption (SFC). Uninstalled SFC may be improved for subsonic turbofan engines as fan pressure ratio is reduced. However, as fan pressure ratio is reduced the airflow through the fan must increase to retain the required maximum thrust from the engine. This, in turn, requires a larger diameter fan which increases engine weight and increases nacelle scrubbing and interference drag. These effects diminish the uninstalled advantage of a low fan-pressure ratio engine to the point that when the engine is installed in the aircraft the overall efficiency of operation is diminishingly reduced.

Various types of fan arrangements are known and include, for example, fan blades having mid-span shrouds which radially divide the airflow into outer and inner portions, with the inner portion undergoing compression in a booster compressor for increasing the overall propulsion efficiency of the engine for obtaining improved SFC. However, the blade mid-span shrouds are typically integrally joined to the blade which requires a more complex and expensive manufacturing process. Furthermore, the additional centrifugal loads from the mid-span shroud must be carried through the blade dovetail and into the rotor disk which must be suitably sized for obtaining acceptable stress for a useful life.

More specifically, the blade includes an airfoil which is conventionally aerodynamically configured for obtaining a suitable pressure rise in the airflow channeled thereover during operation, with the airfoil ending at a root integrally formed with the dovetail which secures the blade to the rotor disk through a complementary retaining dovetail slot therein. The dovetail is a structural member configured solely for supporting the blade in operation and carrying the relatively large centrifugal loads from the blade into the rotor disk. The blade includes a transition in configuration between the airfoil and the dovetail, which transition is typically hidden by conventional flowpath platforms defining the inner boundary of the airflow over the blade airfoil. Accordingly, the aerodynamic efficiency of the blade is limited by the non-aerodynamic transition between the airfoil and dovetail required in each blade design for suitably carrying the centrifugal loads to the dovetail.

SUMMARY OF THE INVENTION

A hybrid gas turbine engine rotor blade includes an airfoil and a dovetail integrally joined thereto. The airfoil includes an inner portion disposed adjacent to the dovetail to provide a structural transition, and an outer portion disposed thereabove for effecting a pressure rise in airflow channeled thereacross. A nosepiece is disposed adjacent to the leading edge of the airfoil inner portion, and a tailpiece is disposed adjacent to the trailing edge of the airfoil inner portion. The nosepiece, tailpiece, and airfoil inner portion are collectively aerodynamically configured for effecting a pressure rise in the airflow channeled thereacross.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
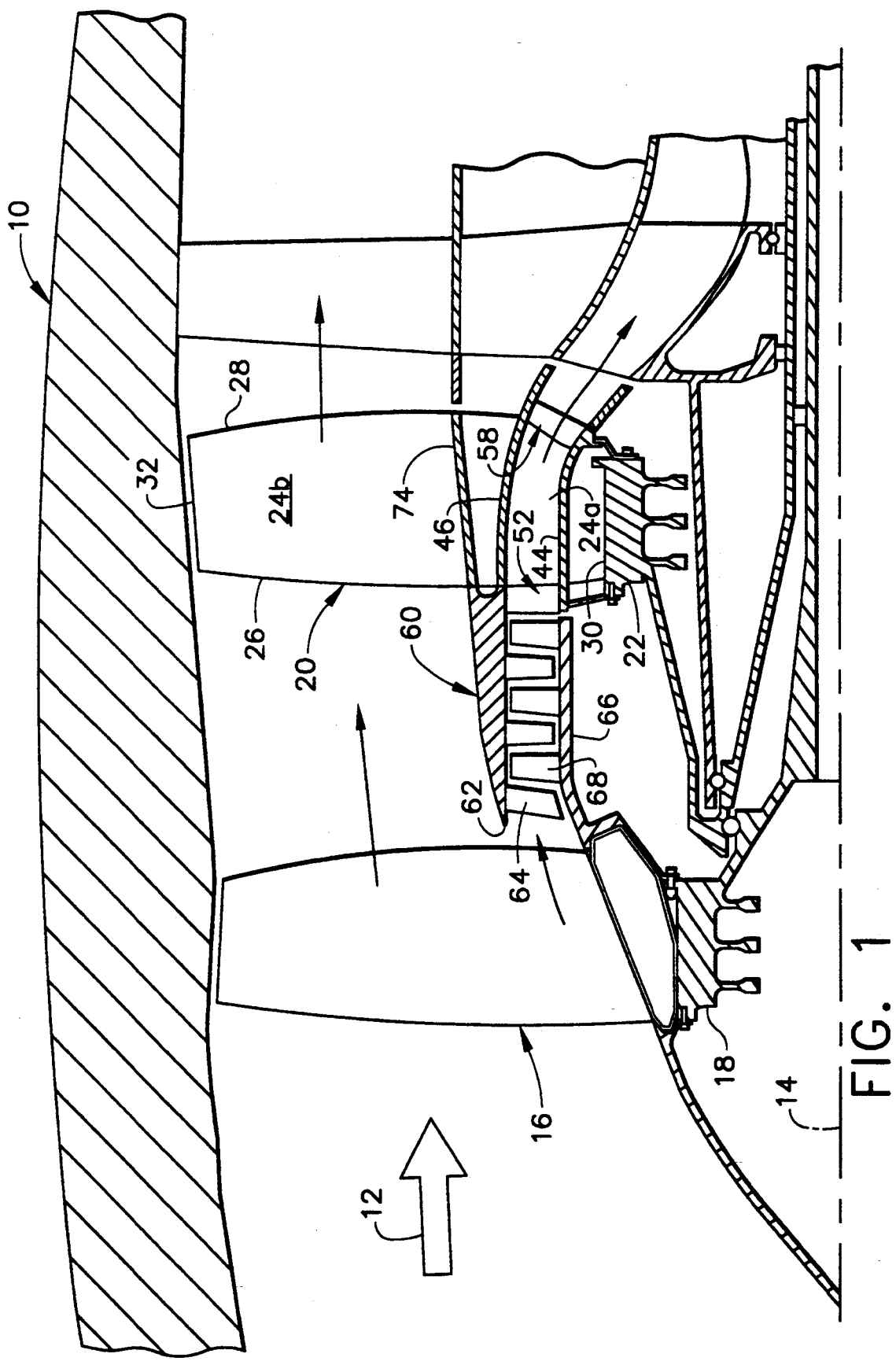
FIG. 1 is a longitudinal, partly sectional view along an axial centerline axis of a portion of an exemplary aircraft turbofan gas turbine engine having an aft fan blade in accordance with one embodiment of the present invention.

Illustrated schematically in FIG. 1 is the fan portion of an aircraft turbofan gas turbine engine 10 which receives ambient airflow 12. In this exemplary embodiment, the engine 10 includes counterrotating forward and aft fans axially spaced apart from each other about a longitudinal or axial centerline axis 14. The forward fan includes a plurality of circumferentially spaced apart forward fan blades 16 which are conventional in configuration and fixedly joined to a forward rotor disk 18. The aft fan includes a plurality of circumferentially spaced apart aft fan or rotor blades 20 in accordance with one embodiment of the present invention which are conventionally fixedly joined to an aft rotor disk 22. The forward and aft rotor disks 18, 22 are conventionally joined to respective turbine rotors (not shown) which provide power thereto for rotating the two disks 18, 22 in opposite directions. The forward and aft fan blades 16, 20 therefore are each configured for rotating oppositely to each other for pressurizing the airflow 12 as it passes thereover.

Figure 2:
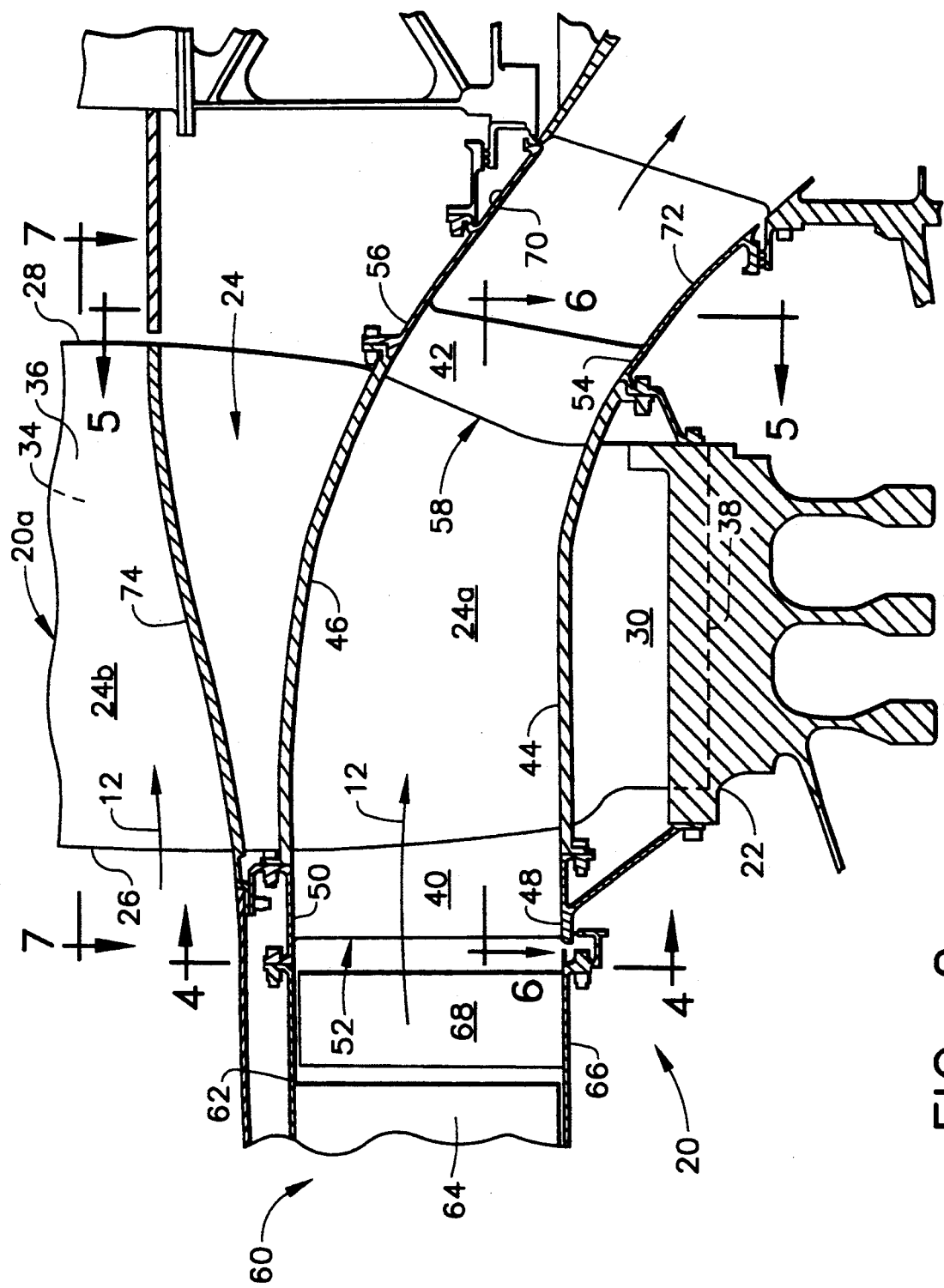
FIG. 2 is an enlarged, partly sectional view of a portion of the aft fan blade illustrated in FIG. 1 joined to a rotor disk adjacent to a booster compressor.
Figure 3:
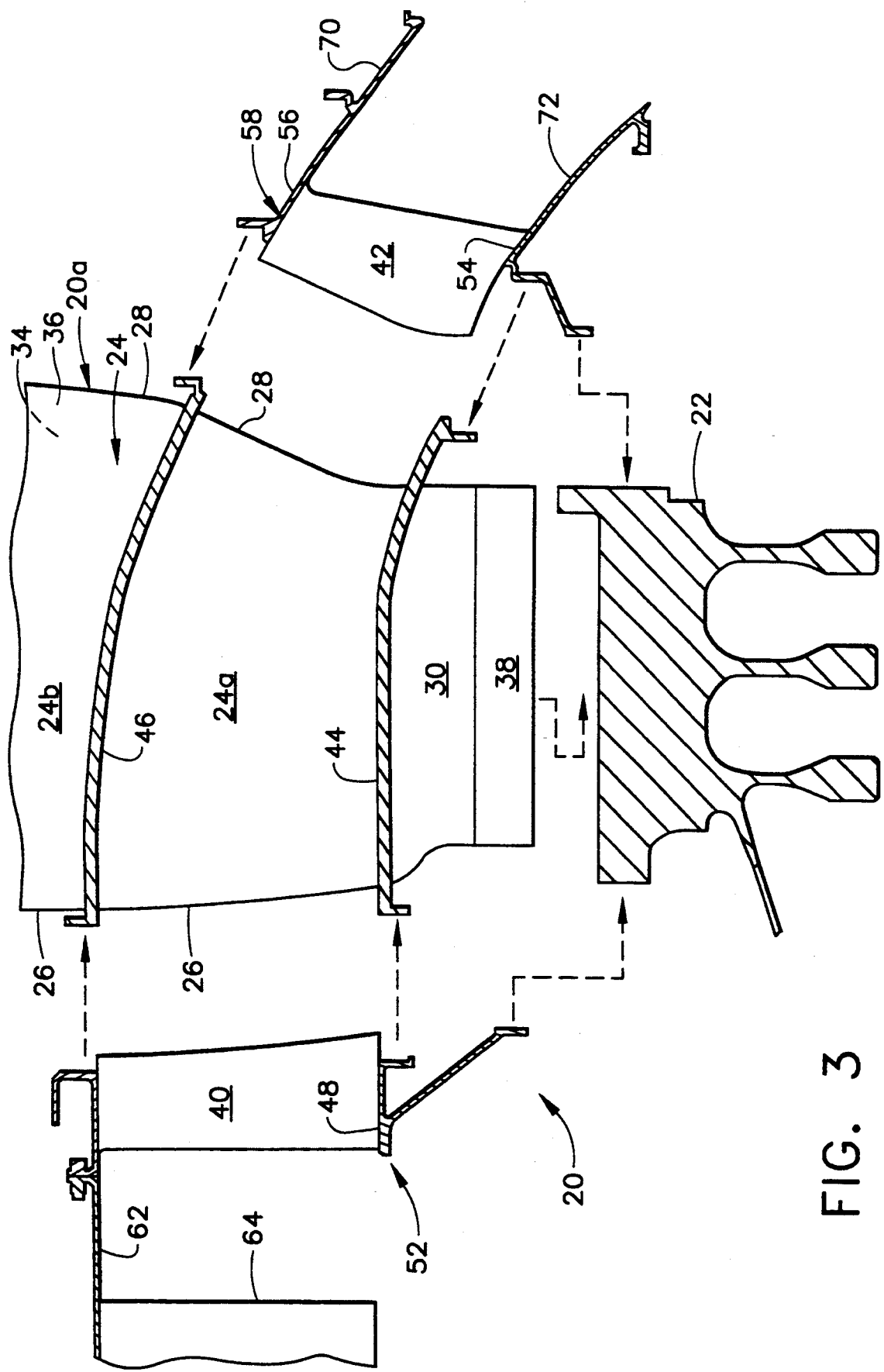
FIG. 3 is an exploded view of a portion of the aft fan blade illustrated in FIG. 2 showing a discrete nosepiece, inner and outer flow platforms, and a tailpiece removably joinable thereto.

The radially inner portion of the aft fan is illustrated in more particularity in FIGS. 2 and 3 shown assembled and in exploded view, respectively. Each of the aft fan blades 20 is a hybrid or composite assembly of discrete components which collectively improve the aerodynamic efficiency of the blade 20 with readily manufacturable components thereof. More specifically, each aft fan blade 20 includes a conventional airfoil 24 having a leading edge 26 and a trailing edge 28 extending radially from a radially inner root or hub 30 to a radially outer tip 32 (see FIG. 1) which collectively define a first, generally concave outwardly side 34 and a second, generally convex outwardly opposite side 36 over which flows the airflow 12 during operation. The fan blade 20 further includes a conventional dovetail 38 integrally joined to the airfoil root 30 for conventionally removably mounting the airfoil 24 in complementary dovetail slots in the aft rotor disk 22.

The airfoil 24 includes a radially inner portion 24a disposed adjacent to the root 30, and a radially outer portion 24b disposed adjacent to the tip 32 radially above the inner portion 24a. The airfoil outer portion 24b is conventionally aerodynamically configured from the leading edge 26 to the trailing edge 28 for effecting a primary pressure rise in the airflow 12 channeled thereacross. And, the airfoil inner portion 24a is also conventionally configured from the leading edge 26 to the trailing edge 28 to provide a structural transition from the airfoil outer portion 24b to the dovetail 30. Accordingly, the airfoil 24 and the dovetail 38 integrally joined thereto are conventional and collectively define a conventionally configured, discrete fan blade designated 20a which is relatively simple in structure and conventionally joined to the aft rotor disk 22.

However, in order to improve the aerodynamic efficiency of the singular rotor blade 20a, it is used in combination with additional, discrete, adjoining components to form the hybrid rotor blade 20 which is therefore a composite assembly of components. More specifically, as shown in FIGS. 2 and 3, the hybrid rotor blade 20 further includes a discrete nosepiece 40 disposed adjacent to and abutting the leading edge 26 of solely the airfoil inner portion 24a, and a discrete tailpiece 42 disposed adjacent to and abutting the trailing edge 28 of solely the airfoil inner portion 24a. The nosepiece 40, tailpiece 42, and airfoil inner portion 24a are collectively aerodynamically configured for effecting a secondary pressure rise in the airflow 12 channeled thereacross as illustrated in more particularity in FIGS. 4–6. The cooperating nosepiece 40 and tailpiece 42 allow the transitioning airfoil inner portion 24a to be configured more similarly to the aerodynamically configured airfoil outer portion 24b as illustrated in FIG. 7 for obtaining useful aerodynamic work therefrom to provide the secondary pressure rise.

Figure 7:
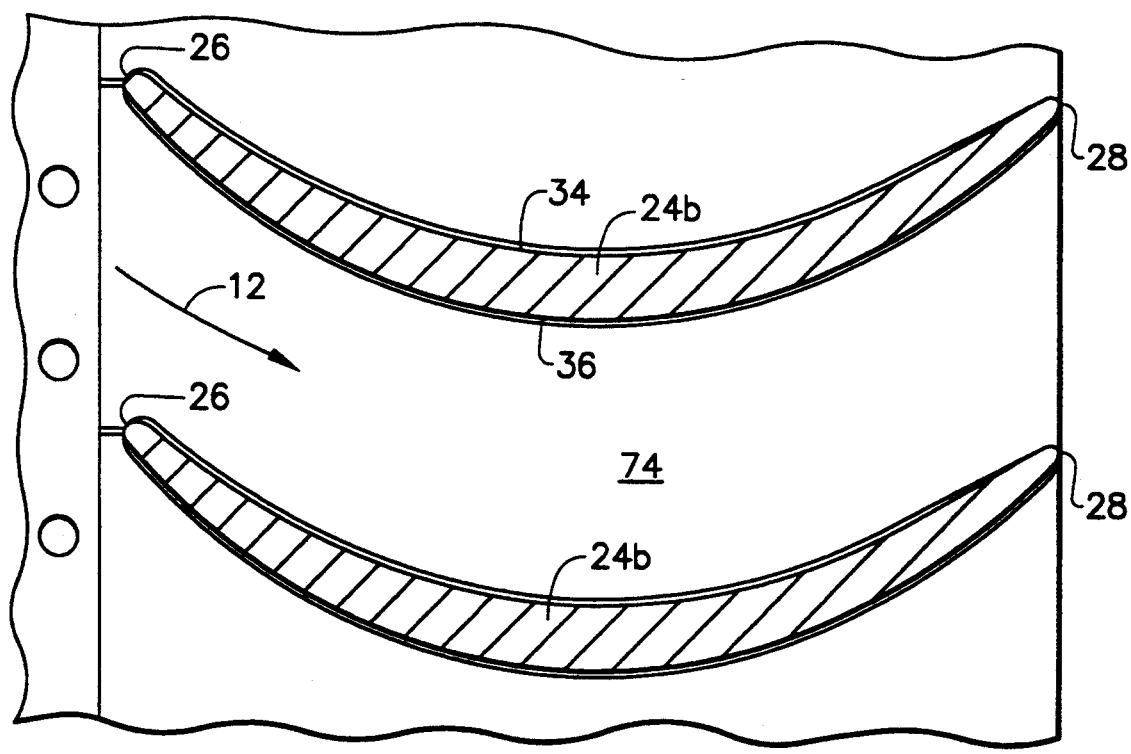
FIG. 7 is a radial, partly sectional view of adjacent aft fan blades illustrated in FIG. 2 and taken along line 7—7.

FIG. 7 illustrates an exemplary radial sectional profile or configuration of the airfoil outer portion 24b from its leading edge 26 to its trailing edge 28 with its concave first side 34 and convex second side 36. This aerodynamic, crescent configuration provides maximum work on the airflow 12 channeled thereover to effect the primary pressure rise over the airfoil outer portion 24b.

Figure 6:
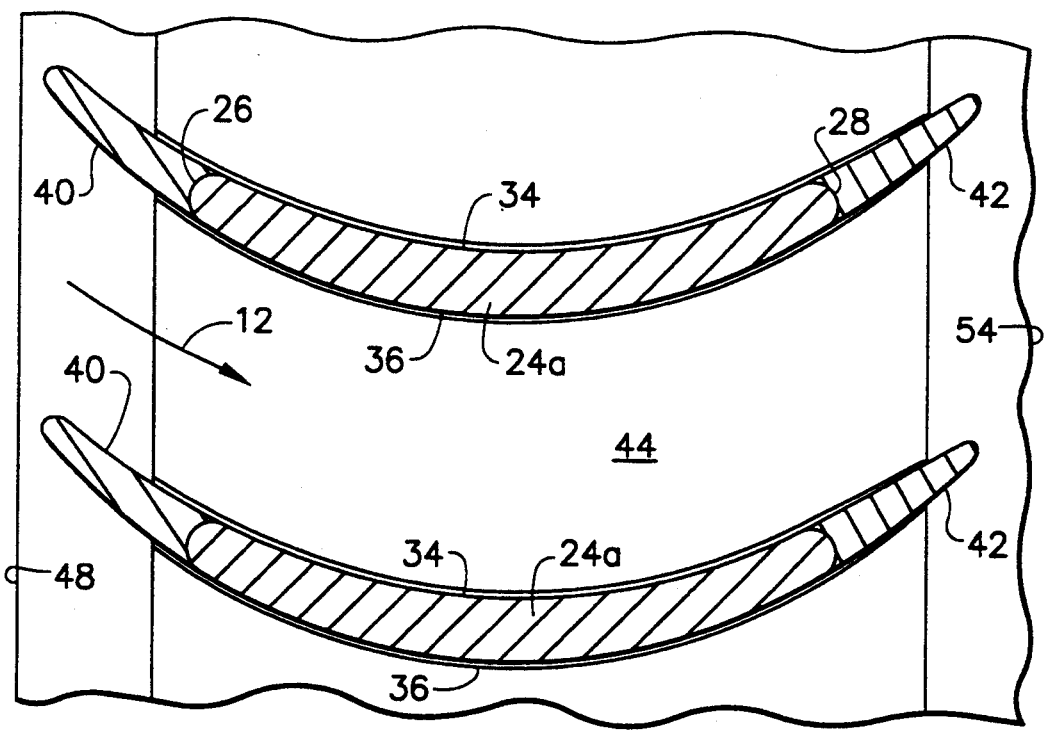
FIG. 6 is a radial, partly sectional view of adjacent aft fan blades illustrated in FIG. 2 and taken along line 6—6.

Since the airfoil inner portion 24a is conventionally designed for providing the required transition in shape from the airfoil outer portion 24b to the dovetail 38, it is not aerodynamically shaped or effective alone for providing any useful aerodynamic work and would be typically hidden below flowpath platforms. However, by combining the nosepiece 40 at the leading edge 26 of the airfoil inner portion 24a, and the tailpiece 42 at the trailing edge 28 thereof, these components may be collectively configured in a useful aerodynamic configuration for obtaining useful work therefrom to provide the secondary pressure rise of the airflow 12 near the blade root 30 which would otherwise not be obtained. As shown in FIG. 6, the nosepiece 40 has a conventional leading edge at its forward end which first receives the airflow 12, with its trailing edge preferably sealingly joined to or abutting the airfoil inner portion 24a at the leading edge 26. Similarly, the tailpiece 42 has a conventional trailing edge at its aft end from which the airflow 12 is discharged in a downstream direction, and its leading edge at the forward end thereof is sealingly joined to or abuts the airfoil inner portion 24a at its trailing edge 28. The abutting joints between the airfoil inner portion 24a and the respective nosepiece 40 and tailpiece 42 may simply be machined surfaces which minimize the gaps therebetween, or the gaps therebetween may include a suitable sealing structure or material to minimize or prevent leakage therethrough. In this way, leakage of the airflow 12 between adjacent ones of the airfoil inner portions 24a is reduced or eliminated for improving the pressurizing efficiency thereof.

Figure 4:
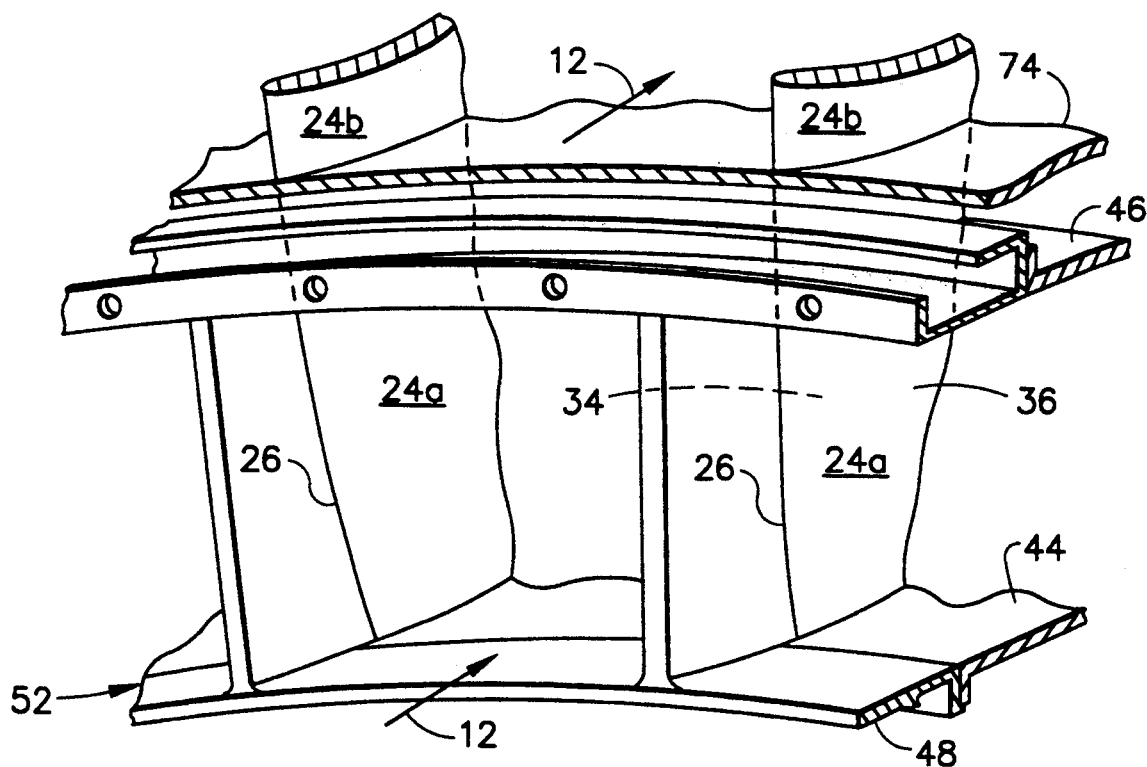
FIG. 4 is an aft facing, partly sectional view of a portion of the aft fan blades illustrated in FIG. 2 and taken along line 4—4.
Figure 5:
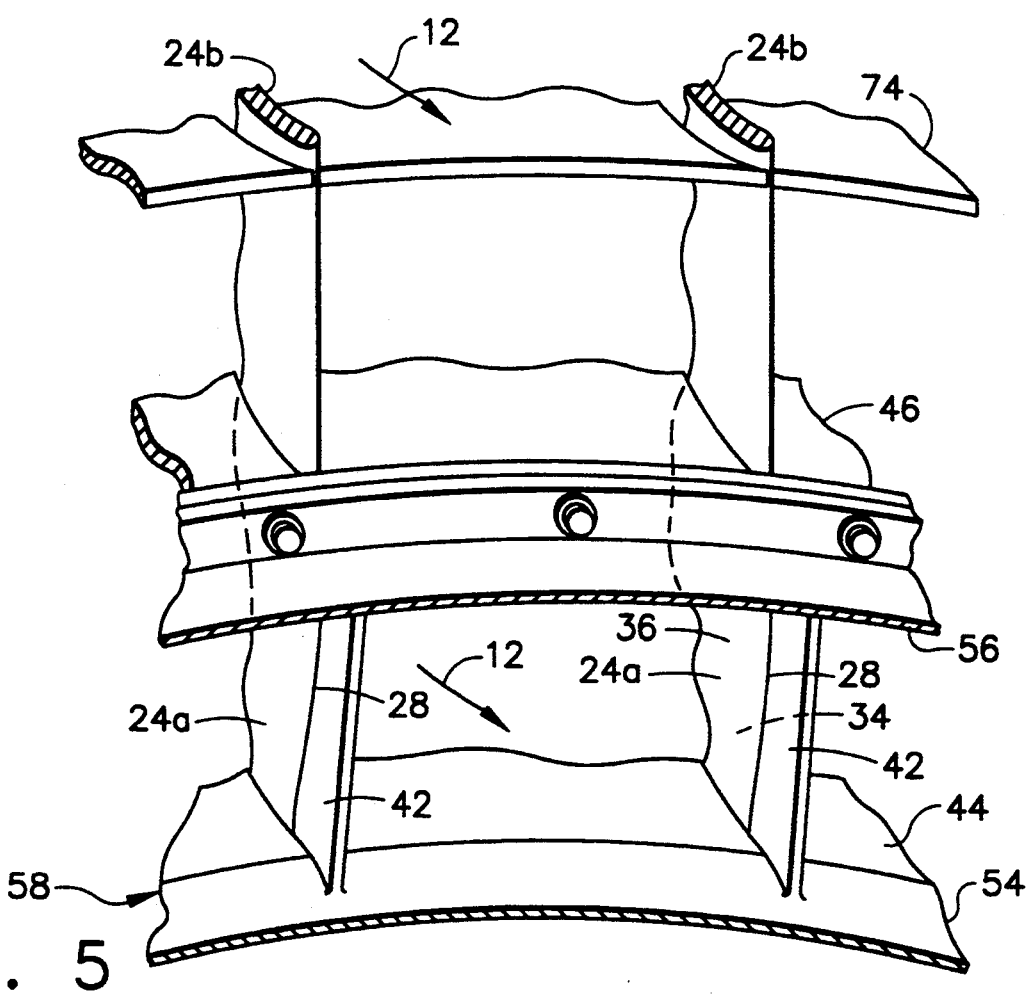
FIG. 5 is a forward facing, partly sectional view of a portion of the aft fan blades illustrated in FIG. 2 and taken along line 5—5.

In the exemplary embodiments illustrated in the Figures, the airflow 12 channeled over the airfoil inner and outer portions 24a, 24b is preferably separated to obtain two different pressure rises therefrom. As shown in FIGS. 2-5, the hybrid fan blade 20 preferably also includes a discrete, radially inner platform 44 abutting the airfoil inner portion 24a adjacent to the dovetail 38 to provide an inner flow boundary for the airflow 12 channeled across the airfoil inner portion 24a. A discrete, radially outer platform 46 similarly abuts the airfoil inner portion 24a adjacent to the airfoil outer platform 24b and is spaced radially outwardly from the inner platform 44 to provide an outer flow boundary for the airflow 12 channeled across the airfoil inner portion 24a. As shown in FIGS. 4–6, the inner and outer platforms 44, 46 are discrete members extending circumferentially between adjacent ones of the airfoils 24 and are sealingly joined thereto in abutting contact. The side profiles of the platforms 44, 46 may be suitably machined complementary in configuration with the airfoils 24 where they adjoin to provide relatively small sealing gaps therebetween. The gaps may be filled with a suitable structure or material to improve sealing therebetween if desired. In this way, the airflow 12 channeled axially between the radially spaced apart inner and outer platforms 44, 46 and circumferentially between adjacent ones of the airfoil inner portions 24a is confined therebetween for obtaining the secondary pressure rise thereof.

As shown in FIGS. 2-5, the aft fan includes a plurality of circumferentially spaced apart ones of the hybrid rotor blades 20 including in combination respective pluralities of the nosepieces 40, tailpieces 42, and inner and outer platforms 44, 46. In order to prevent any modifications to the original fan blade 20a when assembled in the hybrid fan blade 20, no load supporting connections thereto are provided in accordance with the present invention. The aft rotor disk 22 conventionally supports the plurality of airfoils 24 thereon by the integral dovetails 38, with the additional components of the hybrid fan blades 20 being independently supported by the aft rotor disk 22 to provide a secondary loadpath.

More specifically, and as shown in FIGS. 2-5, an arcuate forward inner band 48 is fixedly joined to the plurality of nosepieces 40 at radially inner ends thereof, and is removably fixedly joined by suitable bolts to the inner platforms 44 at forward ends thereof. An arcuate forward outer band 50 is fixedly joined to the plurality of nosepieces 40 at radially outer ends thereof, and is removably fixedly joined by suitable bolts to the outer platforms 46 at forward ends thereof. In the preferred embodiment, the forward inner and outer bands 48, 50 are annular, 360° members integrally joined by casting or brazing with the plurality of circumferentially spaced apart nosepieces 40 to collectively define a forward frame 52.

An arcuate aft inner band 54 is similarly fixedly joined to the plurality of tailpieces 42 at radially inner ends thereof, and is removably fixedly joined by suitable bolts to the inner platforms 44 at aft ends thereof. An arcuate aft outer band 56 is fixedly joined to the plurality of tailpieces 42 at radially outer ends thereof, and is removably fixedly joined by suitable bolts to the outer platforms 46 at aft ends thereof. The aft inner and outer bands 54, 56 are similarly annular, 360° members fixedly joined by being integrally cast or brazed with the plurality of circumferentially spaced apart tailpieces 42 to collectively define an aft frame 58.

The forward and aft inner bands 48, 54 are fixedly joined to opposite ends of the aft rotor disk 22 as illustrated in FIG. 2 by integral flanges suitably bolted to the forward and aft faces of the disk 22. In this way, the forward and aft frames 52, 58 including the nosepieces 40, tailpieces 42, and inner and outer platforms 44, 46 are joined to the aft rotor disk 22 independently of the airfoils 24. Centrifugal loads therefrom are carried through the inner bands 48, 54 directly to the aft disk 22 and therefore are not carried by the blade dovetails 38 which may remain relatively small for carrying centrifugal loads solely from the airfoils 24.

In the exemplary embodiment illustrated in FIG. 1, a conventional, counterrotating booster compressor 60 is disposed upstream of the forward frame 52 and is supported and driven thereby for channeling the airflow 12 compressed in the booster compressor 60 between the nosepieces 40 and inner and outer platforms 44, 46 as illustrated in FIG. 2 for discharge between the tailpieces 42. As shown in FIG. 2, the booster compressor 60 includes an annular outer rotor 62 having a plurality of circumferentially spaced apart outer booster rotor blades 64 extending radially inwardly therefrom in several axial stages, and an annular inner rotor 66 having a plurality of inner booster rotor blades 68 extending radially outwardly therefrom in several complementary axial stages. The booster outer rotor 62 is fixedly joined at its aft end by a suitable flange and bolts to, and is driven by, the forward frame 52 joined to the aft rotor disk 22. The forward frame 52 therefore also provides a structural path for driving the booster outer rotor 62. The booster inner rotor 66 is joined to and driven by the forward disk 18 as shown in FIG. 1.

As shown in FIGS. 2 and 3, the booster 60 also includes an aft annular outer flowpath wall 70 fixedly joined to the aft outer band 56 of the aft frame 58 by suitable bolts. And, an annular aft inner flowpath wall 72 is similarly fixedly joined to the aft inner band 54 of the aft frame 58 by suitable bolts. The aft outer and inner flowpath walls 70, 72 are radially spaced apart for channeling the airflow 12 discharged from the nosepieces 42 further downstream for flow to the high pressure compressor (not shown) of the core engine. In this way, the aft frame 58 supports the flowpath walls 70, 72 which rotate therewith during operation.

As shown in FIGS. 1 and 2, the airfoil inner portions 24a of the aft fan blades 20 form a portion of the booster flowpath for additionally pressurizing the airflow 12 channeled therethrough and radially inwardly into the core engine. The airfoil outer portions 24b receive the radially outer portion of the airflow 12 from the forward fan blades 16 to increase the pressure thereof and provide thrust for the engine 10. Since the two flowpaths over the airfoil portions 24a, 24b diverge radially apart, an auxiliary platform 74 may be disposed radially above respective ones of the outer platforms 46 and is fixedly joined to the forward frame 52. The auxiliary platforms 74 diverge radially away from the outer platforms 46 to provide a radially inner boundary for the airflow 12 channeled across the airfoil outer portions 24b. The auxiliary platforms 74 are similarly sealingly joined to the airfoil outer portions 24b in suitable abutting contact therewith and are supported by the forward frame 52 so that the centrifugal loads therefrom during operation are carried through the nosepieces 40 and the forward inner band 48 directly to the aft rotor disk 22.

The hybrid fan blades 20 disclosed above allow the use of existing, proven original fan blade 20a and aft rotor disk 22 designs without alteration, but with an increased aerodynamic efficiency by utilizing the airfoil inner portions 24a for performing useful work in pressurizing the airflow 12. Since the aerodynamic efficiency is increased, the size or outer diameter of the fan blades 20 may be correspondingly reduced, with the flowpath radius ratio also being correspondingly reduced, for providing substantial thrust with increased efficiency which therefore increases SFC. The forward frame 52 provides the structural loadpath for driving the booster outer rotor 62 in a relatively simple and compact configuration. Manufacturing costs and system weight therefore may be kept to conventional levels with a more efficient combination.

Although the invention has been described with respect to an exemplary counterrotating fan assembly, it may be used in alternate designs including single rotating fans wherein it may be used to advantage.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A hybrid gas turbine engine rotor blade comprising:
    an airfoil having a leading edge and a trailing edge extending from a root to a tip defining therebetween first and second opposite sides;
    a dovetail integrally joined to said airfoil root for removably mounting said airfoil to a rotor disk;
    said airfoil having an inner portion disposed adjacent to said root, and an outer portion disposed adjacent to said tip, said airfoil outer portion being aerodynamically configured from said leading edge to said trailing edge for effecting a primary pressure rise in airflow channeled thereacross, and said airfoil inner portion being configured from said leading edge to said trailing edge to provide a structural transition from said airfoil outer portion to said dovetail;

a nosepiece disposed adjacent to said leading edge of said airfoil inner portion;

a tailpiece disposed adjacent to said trailing edge of said airfoil inner portion; and said nosepiece, said tailpiece, and said airfoil inner portion being collectively aerodynamically configured for effecting a secondary pressure rise in airflow channeled thereacross.

2. A rotor blade according to claim 1 further comprising:

an inner platform abutting said airfoil inner portion adjacent to said dovetail to provide an inner flow boundary for said airflow channeled across said airfoil inner portion; and an outer platform abutting said airfoil inner portion adjacent to said airfoil outer portion and spaced from said inner platform to provide an outer flow boundary for said airflow channeled across said airfoil inner portion.

3. A hybrid gas turbine engine rotor comprising:

a plurality of circumferentially spaced apart rotor blades each comprising:

an airfoil having a leading edge and a trailing edge extending from a root to a tip defining therebetween first and second opposite sides;

a dovetail integrally joined to said airfoil root for removably mounting said airfoil to a rotor disk;

an inner platform abutting said airfoil inner portion adjacent to said dovetail to provide an inner flow boundary for said airflow channeled across said airfoil inner portion;

an outer platform abutting said airfoil inner portion adjacent to said airfoil outer portion and spaced from said inner platform to provide an outer flow boundary for said airflow channeled across said airfoil inner portion;

said airfoil having an inner portion disposed adjacent to said root, and an outer portion disposed adjacent to said tip, said airfoil outer portion being aerodynamically configured from said leading edge to said trailing edge for effecting a primary pressure rise in airflow channeled thereacross, and said airfoil inner portion being configured from said leading edge to said trailing edge to provide a structural transition from said airfoil outer portion to said dovetail;

a nosepiece disposed adjacent to said leading edge of said airfoil inner portion;

a tailpiece disposed adjacent to said trailing edge of said airfoil inner portion; and said nosepiece, said tailpiece, and said airfoil inner portion being collectively aerodynamically configured for effecting a secondary pressure rise in airflow channeled thereacross;

an arcuate forward inner band fixedly joined to said plurality of nosepieces at inner ends thereof, and fixedly joined to said inner platforms at forward ends thereof;

an arcuate forward outer band fixedly joined to said plurality of nosepieces at outer ends thereof, and fixedly joined to said outer platforms at forward ends thereof;

an arcuate aft inner band fixedly joined to said plurality of tailpieces at inner ends thereof, and fixedly joined to said inner platforms at aft ends thereof; and an arcuate aft outer band fixedly joined to said plurality of tailpieces at outer ends thereof, and fixedly joined to said outer platforms at aft ends thereof.

4. A hybrid gas turbine engine rotor according to claim 3 further comprising:

said rotor disk supporting said plurality of airfoils thereon; and said forward and aft inner bands being fixedly joined to said disk for supporting said nosepieces, tailpieces, and inner and outer platforms thereto independently of said airfoils.

5. A hybrid gas turbine engine rotor according to claim 4 wherein:

said forward inner and outer bands are annular and define with said plurality of nosepieces joined thereto a forward frame; and said aft inner and outer bands are annular and define with said plurality of tailpieces joined thereto an aft frame.

6. A hybrid gas turbine engine rotor according to claim 5 further comprising:

a booster compressor disposed upstream of said forward frame and supported thereby for channeling compressed airflow between said nosepieces and said inner and outer platforms for discharge between said tailpieces;

an aft outer flowpath wall fixedly joined to said aft outer band of said aft frame;

an aft inner flowpath wall fixedly Joined to said aft inner band of said aft frame; and said aft outer and inner flowpath walls being radially spaced apart for channeling said airflow discharged from said nosepieces.

7. A hybrid gas turbine engine rotor according to claim 6 wherein said rotor blades are aft fan blades joined to an aft rotor disk, and further comprising:

a plurality of circumferentially spaced apart forward fan blades fixedly joined to a forward rotor disk configured for rotating oppositely to said aft fan blades for effecting counterrotation therebetween;

said booster compressor including an outer rotor having a plurality of outer booster blades extending radially inwardly therefrom, and an inner rotor having a plurality of inner booster blades extending radially outwardly therefrom; and said booster outer rotor is fixedly joined to and driven by said forward frame joined to said aft rotor disk.

8. A hybrid gas turbine engine rotor according to claim 6 wherein said nosepieces and said tailpieces are sealingly joined to said airfoil inner portions at said leading and trailing edges thereof.

9. A hybrid gas turbine engine rotor according to claim 6 wherein said inner and outer platform extend circumferentially between adjacent ones of said airfoils and are sealingly joined thereto.

* * * * *